No. 616,462. Patented Dec. 27, 1898.
J. J. HARDEN.
WHEEL TIRE.
(Application filed Oct. 3, 1898.)
(No Model.)

WITNESSES:
Wm. M. Rheem.
Edward T. G. Barnett.

INVENTOR
John J. Harden.
BY
Charles S. Rhee
HIS ATTORNEY.

THE NORRIS PETERS CO., PHOTO-LITHO., WASHINGTON, D. C.

UNITED STATES PATENT OFFICE.

JOHN J. HARDEN, OF CHICAGO, ILLINOIS, ASSIGNOR OF ONE-FOURTH TO FREDERICK T. WHITE AND WILLIAM F. STEWART, OF SAME PLACE.

WHEEL-TIRE.

SPECIFICATION forming part of Letters Patent No. 616,462, dated December 27, 1898.

Application filed October 3, 1898. Serial No. 692,505. (No model.)

*To all whom it may concern:*

Be it known that I, JOHN J. HARDEN, a citizen of the United States of America, residing in Chicago, county of Cook, and State of Illinois, have invented a certain new and useful Improvement in Wheel-Tires, of which the following is a description.

Figure 1:
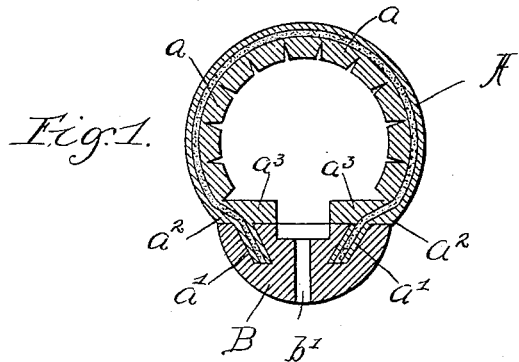
Figure 2:
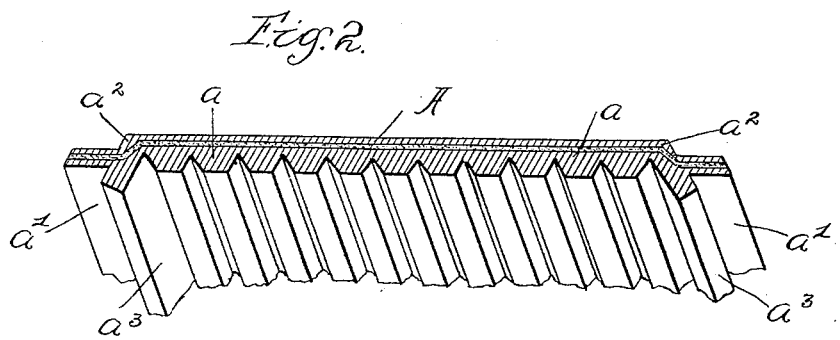
Figure 3:
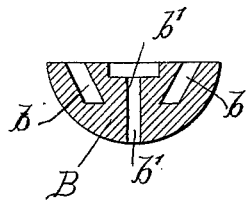

Referring to the accompanying drawings, wherein like reference-letters indicate the same or corresponding parts, Figure 1 is a transverse section radial to the axis of the wheel. Fig. 2 is a perspective view of a portion of the tire shown in Fig. 1. Fig. 3 is a cross-section of the wheel-rim.

My invention relates to wheel-tires, and it particularly relates to tires for bicycles and similar conveyances.

Heretofore bicycle-tires constructed of rubber or other similar material have been of two kinds—"cushion" and "pneumatic." Cushion-tires have been constructed in such manner as either to form a solid ring or a continuous hollow ring or a combination of these two forms. Pneumatic tires, on the other hand, have been constructed in the form of a continuous hollow ring alone, adapted to receive and retain air under pressure, or of a compartment adapted to receive and retain air under pressure, said compartment being inclosed within a substantially continuous hollow ring. The cushion forms of tires have proven defective because of their weight. The pneumatic forms of tires, requiring the use of air-valves, entail a large expenditure in their manufacture, and, being subject to leakage from various causes, are defective.

The object of my invention is to remedy the defects existing in tires of the kinds described and now known in the art; and to that end it consists in the combination of a wheel-rim and a tire having the peculiarities of construction hereinafter more fully set forth, and indicated in the several claims hereto appended.

In the accompanying drawings, A is my novel wheel-tire; $a$, flanges adapted to be inserted into and held by suitable recesses $b$ in the wheel-rim; $a^2$ $a^3$, abutments adapted to bear against the periphery of the wheel-rim; B, a wheel-rim having recesses $b$ for the purpose described and holes $b'$ for the introduction of wheel-spokes.

To apply the tire of my invention to the periphery of the wheel-rim, it is but necessary to introduce the flanges $a'$ into the sockets or incisions $b$ at both sides of the periphery of the rim. When so positioned the strip A becomes essentially tubular in form and is retained in place by means of its own elasticity, or it may be further secured by means of glue or other suitable material. The ends of the strip A may now be secured to each other in any suitable manner, or the ends of said strip may be secured together before the tire is placed about the rim. The ridges $a$ when the tire is adjusted as described being on the inner surface of the tire are caused to approach each other. These ridges have two offices—first, they increase the thickness of the tire, and, secondly, when any pressure is brought to bear on the face of the tire the ridges immediately in line with said pressure are caused to separate, which separation renders the tire more flexible at that point, at the same time increasing the stability of the balance of the tire as the displaced ridges are caused to approach or bear upon their neighbors, and they in turn to approach or bear upon those next to them, thus rendering the balance of the tire substantially solid. The abutments $a^2$ $a^3$ serve to increase the amount of bearing-space of the tire upon the periphery of the wheel-rim, and by preventing the lateral motion of the tire at its junction with the wheel-rim they tend to securely retain the tire in position when once it has been adjusted.

It will be understood that the ridges $a$ may be of any number and size and of any form, angular or undulatory, provided they are separated by V-shaped spaces and their direction be substantially longitudinal, as indicated in the drawings, and that they may be either a part of or attached to the tire proper. It will also be understood that the wheel-rim and abutments $a^2$ $a^3$ may be constructed of any suitable material and of any suitable form and that the tire of my invention may be secured by any suitable means in addition to that effected by its own resiliency.

It will be seen that whereas the tire of my invention is a cushion-tire yet it essentially differs from all other cushion-tires now known in the art. It is not a continuous ring in itself, but when adjusted about the periphery of the wheel-rim, as described, it forms in combination with said wheel-rim a substantially continuous tube or hollow ring.

Having thus described my invention, what I claim as new, and desire to secure by Letters Patent, is—

1. The combination of a wheel-rim having recesses therein adapted to receive and retain the edges of a resilient strip or band, or suitable projections thereon, said resilient strip or band, and ridges $a$ attached to, or a part of, the strip or band, substantially as and for the purpose described.

2. A resilient strip or band A, having flanges $a'$, abutments $a^2$, $a^3$, and ridges $a$, all substantially as, and for the purpose, described.

3. In a wheel, the combination of the following elements: a wheel-rim B; a wheel-tire A having ridges $a$ on its interior face; exterior abutments $a^2$; interior abutments $a^3$; flanges $a'$ adapted to be inserted into, and engaged by, recesses $b$ in the wheel-rim B; all substantially as, and for the purposes described.

JOHN J. HARDEN.

Witnesses:
CHARLES S. HILL,
L. A. GARDINER.